United States Patent [19]

Thomas

[11] 4,359,320
[45] Nov. 16, 1982

[54] JAW SET FOR SNAKE MOUNT

[76] Inventor: Darwin E. Thomas, 8830 Stonelake Pl., Shreveport, La. 71108

[21] Appl. No.: 226,036

[22] Filed: Jan. 19, 1981

[51] Int. Cl.³ .............................................. G09B 23/36
[52] U.S. Cl. ..................................................... 434/296
[58] Field of Search ................................. 434/295, 296

[56] References Cited

U.S. PATENT DOCUMENTS 1,667,205  4/1928  Ingwersen ............................ 434/296
2,306,464  12/1942  Nowotny ............................. 434/296

OTHER PUBLICATIONS

Chieftain Brand Taxidermists Supplies Cat. No. 142, pp. 27, 29 only.
Carolina Biological Supply Co., Cat. No. 37 for 1966–1967, pp. 146, 213, 214, 390 only.

*Primary Examiner*—Harland S. Skoquist

[57] ABSTRACT

A jaw set for insertion in the head of a snake mount mold as a taxidermy aid, which includes a molded upper jaw complete with simulated or real fangs, shaped poison sacs, a jaw seat, palate, and a cooperating lower jaw which is provided with teeth and a plate shaped to mate with or interlock with the jaw seat provided in the upper jaw and simulate the open mouth of a snake.

2 Claims, 6 Drawing Figures

JAW SET FOR SNAKE MOUNT

BACKGROUND OF THE INVENTION

1. FIELD OF THE INVENTION

This invention relates to the art of taxidermy, and more particularly, to a jaw set for mounting in a snake head mold to simulate the open mouth of a snake and facilitate a more realistic mount. The jaw set of this invention is characterized by a shaped upper jaw which includes such life-like features as molded poison sacs and projecting fangs, and a lower jaw which fits into the upper jaw to present a life-lke simulation of a snake's mouth in open configuration. The jaw set is mounted in a prepared mold which simulates the snake's head, and the resulting mount is highly realistic and appears to be authentic. The jaw set can be formed of substantially any material which is suitable for such mounts, including fiberglass and plastic compositions known to those skilled in the taxidermy art.

2. DESCRIPTION OF THE PRIOR ART

The art of taxidermy has long been used to preserve animals and fish for display purposes. Generally, the mounting of a specimen includes thoroughly cleaning the carcass and mounting the skin or hide on a suitable form or mold which is shaped in the configuration of the original specimen. Special agents are used to treat and preserve the hide or skin, and the finished product may be painted or further touched-up to resemble the living specimen. Such forms are generally molded in one piece and are typically formed of such materials as expanded polyurethane and polystyrene.

Particular problems are encountered in the mounting of such specimens as reptiles, and snakes in particular, in that the latter are usually mounted with the mouth open in dramatic fashion. Recreation of the interior of the snake's mouth requires extreme care and attention to detail, which results in a considerable expenditure of time and frequently lacks life-like authenticity. Typically, this recreation is accomplished by shaping a material such as epoxy resin to the desired configuration and allowing the molded material to set. Such art work must be accomplished with a high degree of creativity in order that the finished product closely simulate the original specimen.

Accordingly, it is an object of this invention to provide a jaw set for mounting in a snake mold in a taxidermy application, which jaw set closely resembles the open mouth of a living snake.

Another object of the invention is to provide a molded upper snake jaw and a molded lower snake jaw which closely simulate the upper and lower jaws of a living snake and which mate in an open configuration for mounting in a molded snake head to closely resemble a living snake.

Yet another object of this invention is to provide a molded upper and lower jaw which are shaped to simulate the open mouth of a snake, and which match or interlock to present the simulated open mouth of a snake, which upper and lower jaw are fitted into a molded snake head to closely resemble a living snake.

A stll further object of this invention is to provide a snake jaw set for mounting in a molded snake head which includes an upper jaw having molded fang roots, poison sacs and palate, and further provided with an upper jaw seat for mating with a lower jaw plate shaped in a lower jaw, which lower jaw is provided with simulated teeth and gums.

Another object of the invention is to provide a jaw set for mounting in the head mold of a snake mount to simulate life-like characteristics of the mouth and jaws of a snake, which jaw set includes an upper and a lower jaw shaped to interlock or mate at the rear in order to present a realistic snake head mount configured with the mouth open, and complete with real or simulated fangs and teeth, and molded fang roots, poison sacs, tongue, jaw muscles, gums, and palate.

SUMMARY OF THE INVENTION

These and other objects of the invention are provided in a molded jaw set which simulates the upper and lower jaws and open mouth of a snake, which upper and lower jaws are shaped and molded from a suitable material known to those skilled in the taxidermy art, and are designed to mate or interlock in open configuration and mount in the molded head of a snake form or mold to present a realistic simulation of a living snake. The cooperating jaws are molded to exhibit such realistic anatomical features as fang roots, poison sacs, tongue, teeth, jaw muscles and gums.

DESCRIPTION OF THE PREFERRED EMBODIMENTS

Figure 1:
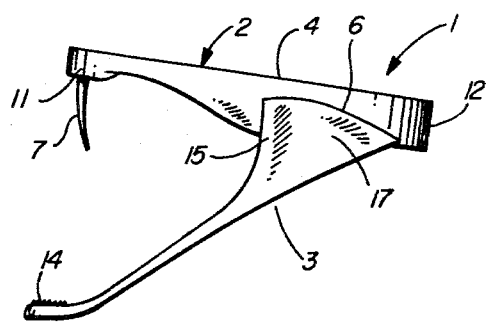
FIG. 1 is a side view of the jaw set.
Figure 2:
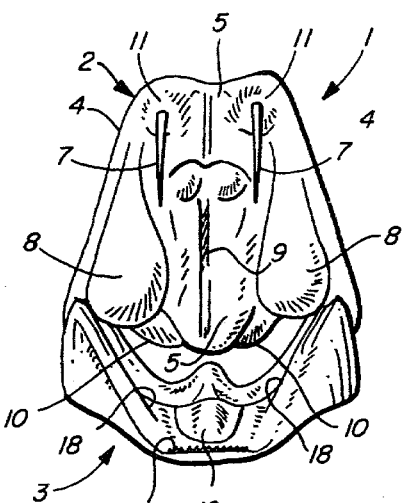
FIG. 2 is a frontal view of the jaw set.
Figure 3:
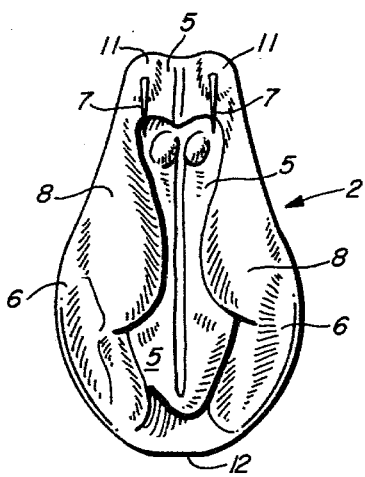
FIG. 3 is a view from above the upper jaw.
Figure 4:
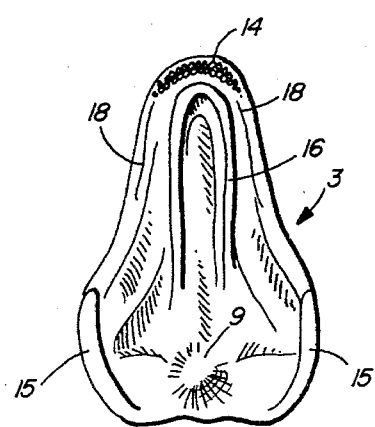
FIG. 4 is an interior view showing the upper jaw.

Referring now to FIGS. 1-4 of the drawing, in a preferred embodiment the jaw set of this invention is illustrated by reference numeral 1, and includes an upper jaw 2 and a cooperating lower jaw 3, in open configuration. Upper jaw 2 is provided with an upper jaw seat 6, which is shaped to receive a lower jaw plate 15 formed in lower jaw 3. Upper jaw 2 is also provided with a set of fang roots 11, from which project curved fangs 7, as is more particularly illustrated in FIGS. 2 and 3. It will be appreciated by those skilled in the art that fangs 7 can be the actual fangs taken from a snake specimen, or they may be simulated fangs, as desired. Referring again to FIG. 1, in a most preferred embodiment of the invention the top segment 4 of upper jaw 2 is flat, and terminates at the rear end of upper jaw 2 in a generally flat rear face 12, in orer to better facilitate mounting upper jaw 2 in a preformed molded head, as hereinafter described. As is particularly illustrated in FIG. 2, upper jaw 2 is shaped to include a palate 5, poison sacs 8, and jaw muscles 10, which closely resemble the anatomical component jaw counterparts of a living snake. Similarly, lower jaw 3 is shaped to include a gum 18, tongue 9, teeth 14, and an inside face 16, and outside face 17, as is more specifically illustrated in FIGS. 1, 2 and 4.

Figure 5:
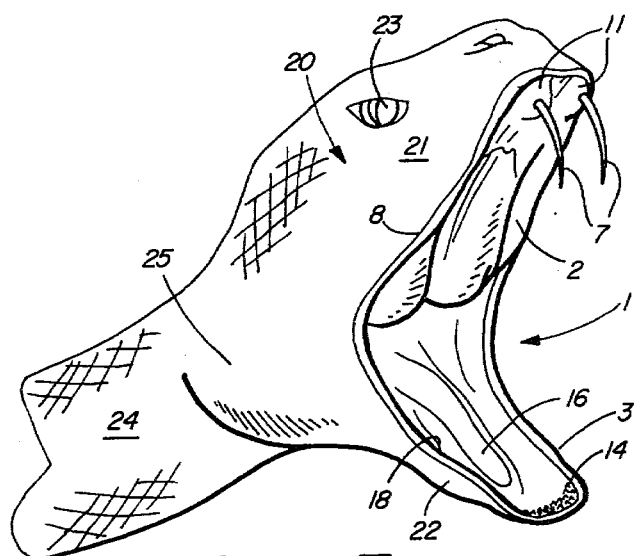
FIG. 5 is a perspective view of the jaw set in a snake head.
Figure 6:
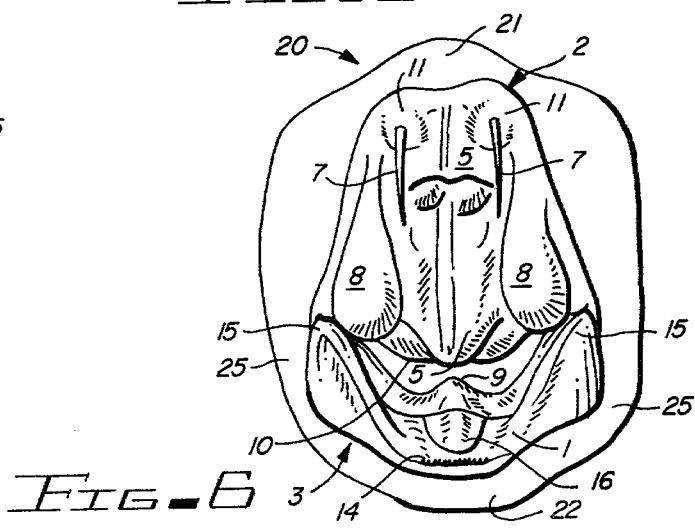
FIG. 6 is a frontal view of the jaw set in a snake head.

Referring now to FIGS. 1, 5 and 6 of the drawing, when upper jaw 2 and lower jaw 3 are interlocked or mated with lower jaw plate 15 seated in upper jaw seat 6, as illustrated in FIG. 1, the jaw set 1 can be inserted in a pre-prepared aperture in a snake head mold 20. When so inserted, the top segment 4 and rear face 12 of upper jaw 2, and the outside face 17 of lower jaw 3 mate with cooperating surfaces (not illustrated) provided in the aperture in head mold 20, and the jaw set 1 can be cemented inside head mold 20 by application of a suitable cement on the cooperating surfaces. In a most preferred embodiment of the invention head mold 20 is shaped from polyurethane or polystryrene to closely resemble a snake's head, and includes a head mold top segment 21 and a head mold bottom segment 22, joined by jaw segments 25. A shaped neck 24 supports head mold 20, and the mold is ultimately provided with detail, including the snake body (not illustrated) and eyes 23.

It will be appreciated by those skilled in the art that use of the molded jaw set 1 in preformed snake amounts such as the head mold 20, greatly expedites the mount by cutting mounting time and enhancing detail and the life-like characteristics and anatomical features of the mount. Jaw sets of any desired size and detail can be provided to mount snakes of substantially any size and mouth configuration. Furthermore, the upper jaw 2 and lower jaw 3 can be matched by properly shaping lower jaw plate 15 and upper jaw seat 6 to permit the jaws to maintain an open configuration at any desired angle from 0 to 90 degrees.

Accordingly, having described my invention with the particularity set forth above, what is claimed is:

1. A jaw set for mounting in the head of a snake mold to simulate the open mouth of a snake comprising:
    (a) an upper jaw shaped to resemble the upper jaw of a snake and provided with simulated anatomical fang roots, poison sacs, palate, jaw muscles, a substantially flat top and a substantially flat rear end at the rear of said top for mounting said upper jaw in said mold, and a first shaped face; and
    (b) a lower jaw shaped to resemble the lower jaw of a snake and provided with simulated teeth and a shaped anatomical gum and tongue, and a second shaped face for mating with said first shaped face of said upper jaw and maintaining said upper jaw and said lower jaw in open configuration.

2. The jaw set of claim 1 wherein said lower jaw further comprises a shaped outside face for mounting said lower jaw in said mold and said second shaped face of said lower jaw and said first shaped face of said upper jaw are configured to permit adjustment of said upper jaw and said lower jaw to vary said open configuration.

* * * * *